Sept. 27, 1949.　　　　　A. A. HEJDUK　　　　　2,483,384
MULTIPLE WELL MANOMETER
Filed July 26, 1944　　　　　　　　　　　　　2 Sheets-Sheet 1
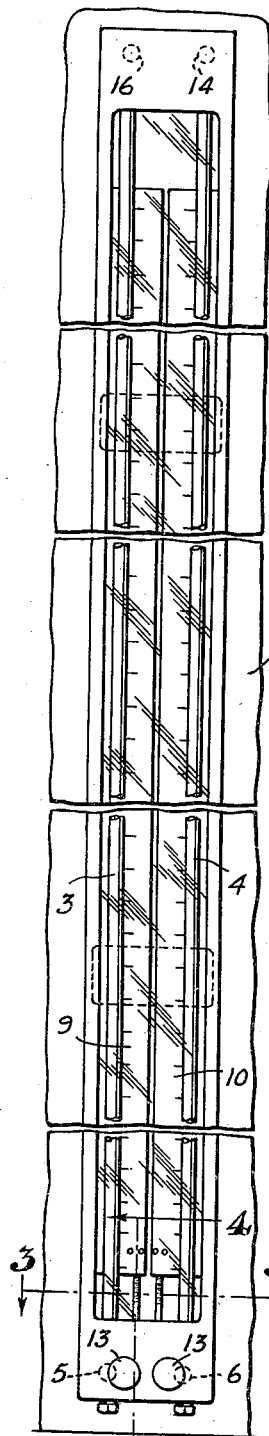
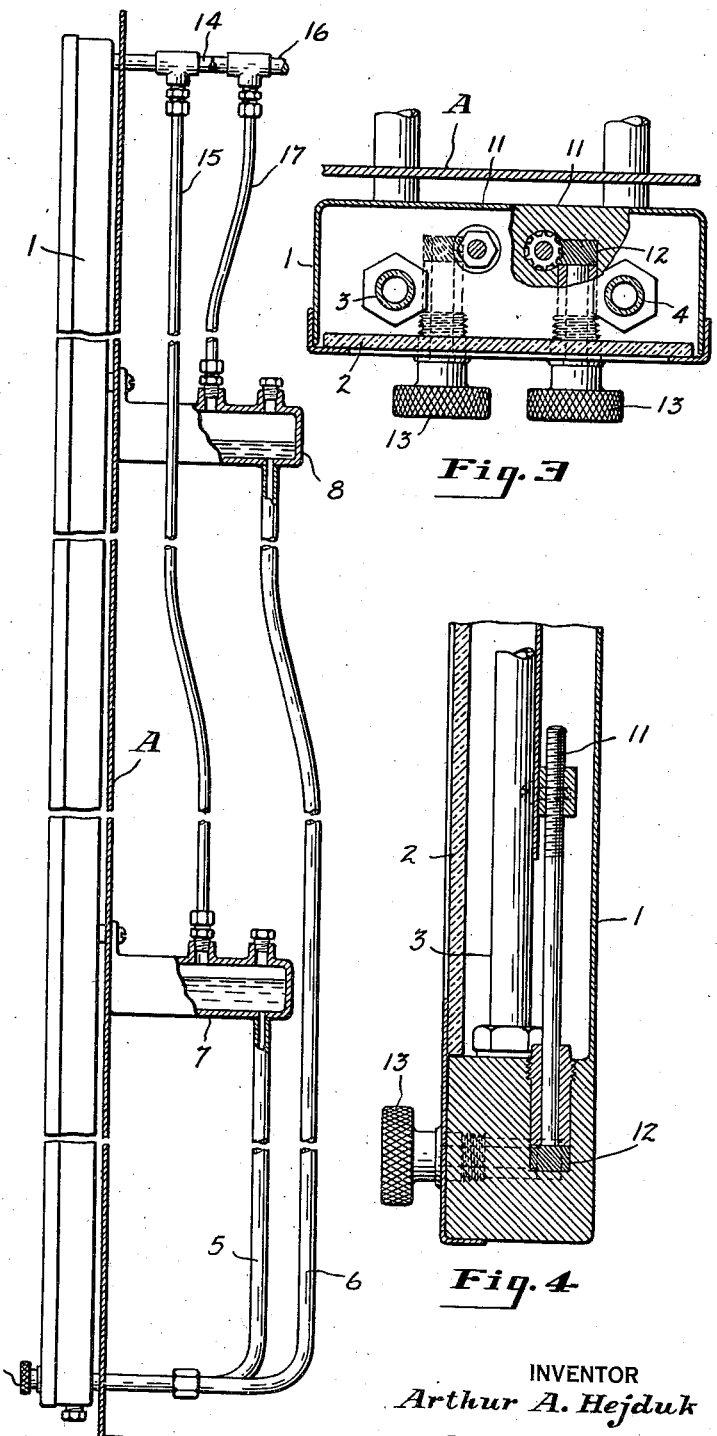
INVENTOR
Arthur A. Hejduk
BY
Evans + McCoy
ATTORNEYS Sept. 27, 1949. A. A. HEJDUK 2,483,384
MULTIPLE WELL MANOMETER
Filed July 26, 1944 2 Sheets-Sheet 2
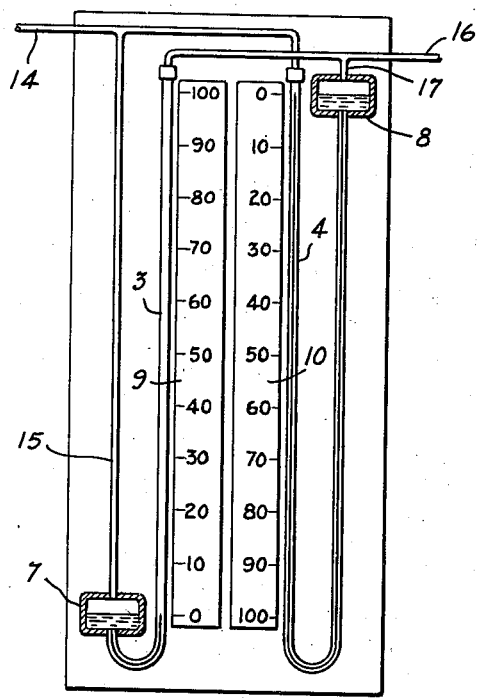
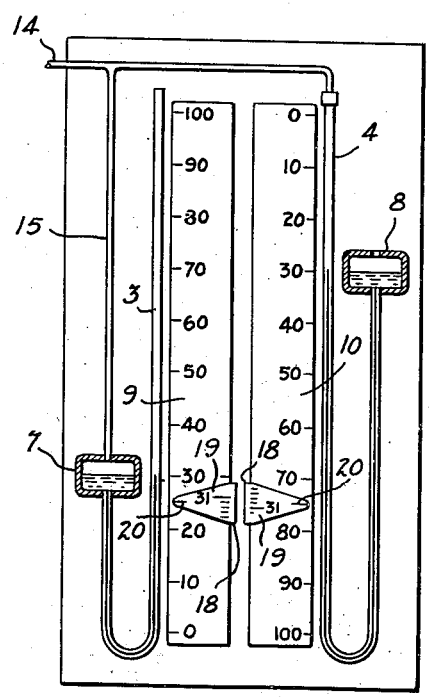
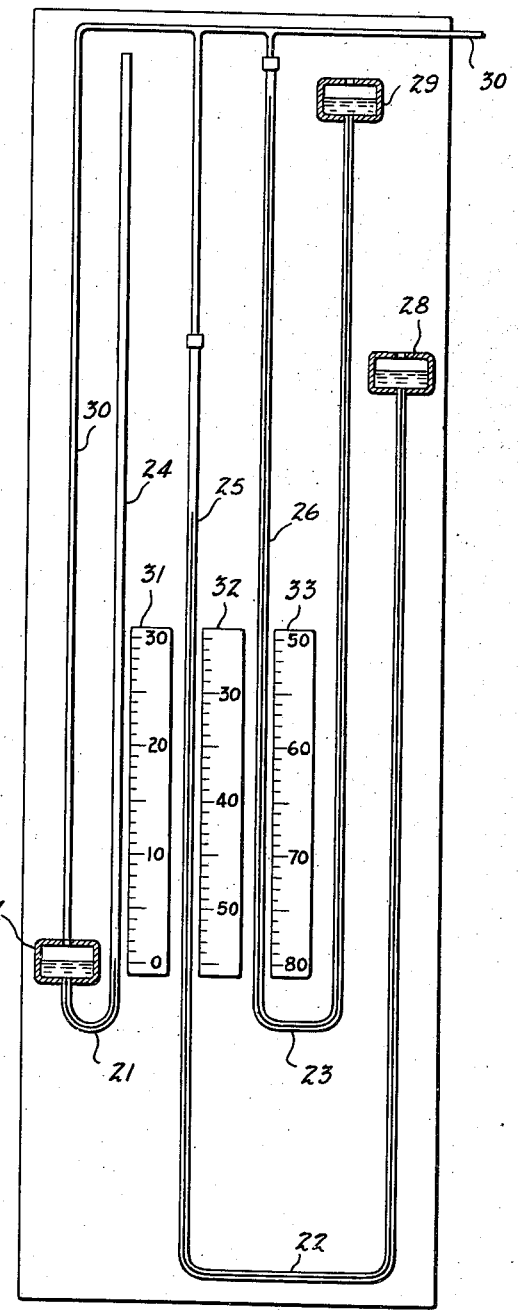
INVENTOR
Arthur A. Hejduk
BY
Evans + McCoy
ATTORNEYS Patented Sept. 27, 1949

2,483,384

UNITED STATES PATENT OFFICE 2,483,384

MULTIPLE WELL MANOMETER

Arthur A. Hejduk, Cleveland, Ohio, assignor to The Meriam Instrument Company, Cleveland, Ohio, a corporation of Ohio Application July 26, 1944, Serial No. 546,668

6 Claims. (Cl. 73—401)

The present invention relates to manometers of the well type suitable for measuring pressures above or below atmospheric, or for measuring differences in pressures.

Heretofore, manometers with long indicating columns have required the use of stepladders, mirrors, etc. to take readings on portions of the column that are not conveniently placed with respect to the operator. For instance, manometers as large as 100" or more in height with water or mercury columns are in common use and such manometers require the use of stepladders for the higher portions of the scale.

The present invention has for its object to facilitate the reading of such manometers by providing multiple columns side by side to which the pressures are so applied and the indicating scales so arranged that all pressures within the range of the instrument are indicated in the lower portion of the length of the manometer so that readings may be conveniently made.

With the above and other objects in view, the invention may be said to comprise the manometer as illustrated in the accompanying drawings hereinafter described and particularly set forth in the appended claims together with such variations and modifications thereof as will be apparent to one skilled in the art to which the invention pertains.

Reference should be had to the accompanying drawings forming a part of this specification in which:

Fig. 1 is a front elevation of a manometer embodying the invention;

Fig. 2 is a side elevation of the manometer with portions of the wells and tubes broken away and shown in section;

Fig. 3 is a section taken on the line indicated at 3—3 in Fig. 1;

Fig. 4 is a section taken on the line indicated at 4—4 in Fig. 1;

Fig. 5 is a diagrammatic view of a manometer embodying the invention and designed for the measurement of differential pressures;

Fig. 6 is a diagrammatic view showing a manometer embodying the invention designed for measurement of absolute pressures;

Fig. 7 is a diagrammatic view showing a modified embodiment of the invention.

In Figs. 1 to 4 of the drawings a manometer embodying the present invention is shown. This manometer is adapted to be mounted upon a vertical wall or panel A and comprises a housing 1 having a front glass panel 2 within which manometer tube indicating legs 3 and 4 that extend substantially the full height of the housing are mounted. The indicating legs 3 and 4 are connected by tubes 5 and 6 with wells 7 and 8 supported on the panel A, the well 7 being adjacent the lower portion of the housing and the well 8 adjacent the upper portion thereof. A graduated scale 9 is secured to the back wall of the housing 1 alongside the leg 3 and a second graduated scale 10 is secured to the back wall alongside the leg 4. The two scales 9 and 10 are independently adjustable vertically so that each may be correctly positioned with respect to its manometer tube. Each of the scales is adjusted by means of a vertically disposed screw 11 that is operated by means of spiral gears 12 which are turned by means of a hand wheel 13 at the lower end of the housing.

Suitable means is provided for subjecting the liquid in the two manometer tubes to the pressure to be measured in such a manner that the column of liquid in one indicating leg moves oppositely with respect to the liquid in the other leg upon an increase or decrease in the applied pressure, the pressure to be measured being applied simultaneously to the liquid in both manometer tubes. The manometer of the present invention may be used to measure differential pressures or to measure absolute pressures above or below atmospheric. As shown in Figs. 1, 2 and 5, high pressure line 14 is connected to the upper end of the leg 4 and also through a tube 15 to the lower well 7. The column of liquid in the leg 4 is forced downwardly by the pressure applied to the upper end thereof while the column of liquid in the leg 3 is forced upwardly by the pressure applied to the liquid in the well 7. The leg 3 and well 8 may be vented to the atmosphere as illustrated in Fig. 6 or as shown in Figs. 1, 2 and 5, a low pressure line 16 may be connected to the upper end of the leg 3 and through a pipe 17 to the upper well 8. It is to be understood that the tube 16 may be subjected to atmospheric pressure when it is desired to directly measure the pressure applied to the leg 4 and that the lines 14 and 16 may be connected to high and low pressure sources when it is desired to measure differences in pressures.

If the instrument is intended for use in measuring absolute pressures, the well 7 is arranged, as shown in Figs. 1, 2 and 6, so that the level of liquid in the indicating leg 3 is normally opposite the graduation on the scales 9 which indicates atmospheric pressure so that readings taken on the scale 9 will indicate absolute pressures and the well 8 is located on the upper portion of the standard in a position such that the liquid in the indicating leg 4 is normally opposite the graduation on the scale 10 indicating atmospheric pressure when reading down from the upper end of the scale. A pressure above atmosphere in the line 14 will force the liquid in the indicating leg 4 downwardly and the liquid in the indicating leg 3 upwardly. A pressure below atmospheric in the line 14 will force the liquid in the leg 3 downwardly and in the leg 4 upwardly. In either case the pressure in the line 14 is indicated simultaneously upon both scales 9 and 10. High pressures are indicated upon the upper portion of the scale 9 and upon the lower portion of the scale 10, and low pressures are indicated on the lower portion of the scale 9 and the upper portion of the scale 10. It follows therefore that any pressure within the range of the instrument can be read upon the lower half of one or the other of the oppositely graduated scales 9 or 10, thus eliminating the inconvenient readings near the upper end of the scales.

When the lines 14 and 16 are connected to high and low pressure sources small differences in pressure are indicated by the position of the liquid column in the tube 3 with respect to the lower half of the scale 9 and greater differences in pressure are indicated by the position of the liquid column in the tube 4 with respect to the lower half of the scale 10.

When the instrument is designed particularly for the measurement of pressure differences, the wells 7 and 8 are preferably positioned as shown in Fig. 5 with the normal level of the liquid in the lower well 7 at the zero point of the scale 9 and the normal liquid level of the well 8 at the zero point of the scale 10, so that pressure differences corresponding to a liquid column the entire height of the scales may be measured, and direct readings of pressure differences may be obtained.

In measurements where barometric pressure is a factor a barometric compensator scale and indicator such as disclosed in my Patent No. 2,335,671, granted November 30, 1943, may be employed. In Fig. 6 of the drawing each of the scales 9 and 10 is provided with a compensator scale 18 and a transparent plate 19 with an index mark 20 thereon is mounted for adjustment longitudinally of each of the scales.

In the instruments illustrated in Figs. 1 to 6 the vertical space required for readings is reduced to substantially one-half by the use of two manometers having wells at different levels and indicating tubes arranged side by side and having oppositely graduated scales. Since all of the pressure readings within the capacity of the instrument may be taken on the lower portion of one of the indicating scales, the scales may be shortened if desired as shown in Fig. 7. If a greater reduction in the space within which readings may be taken is desired, a greater number of manometer tubes with datum points disposed at different elevations may be employed.

In Fig. 7 of the drawings an embodiment of the invention is shown in which three liquid containing manometer tubes 21, 22 and 23 are supported at different elevations, the three well type manometers having vertical indicating legs 24, 25 and 26 positioned side by side. The tube 21 has a well 27 adjacent the lower end thereof and the tubes 22 and 23 have wells disposed at higher elevations. A pressure line 30 is connected to the upper ends of the indicating legs 25 and 26 and to the well 27, the upper end of the indicating leg 24 and the wells 28 and 29 being subjected to atmospheric pressure. Short graduated scales 31, 32 and 33 are positioned alongside the lower portions of the indicating legs 24, 25 and 26. As herein shown the scales 31, 32 and 33 are designed to measure pressures above atmospheric, the scale 31 being graduated from zero to 30, the scale 32 being graduated downwardly from 25 to 55 and the scale 33 being graduated downwardly from 50 to 80. The relative elevation of the wells 28 and 29 are such that pressures from 25 to 55 bring the top column in the tube 25 within the confines of the scale 32 and higher pressures bring the level of the liquid in the tube 26 alongside the graduated scale 33.

It is to be understood that variations and modifications of the specific device herein shown and described for purposes of illustration, may be made without departing from the spirit of the invention.

What I claim is:

1. A manometer of the long indicating column type comprising a manometer tube having one leg adapted to be subjected to the pressure to be measured and a second upright pressure indicating leg subjected to an opposing pressure, a second manometer tube having an upright indicating leg adapted to be subjected to said pressure to be measured and disposed alongside the indicating leg of said first tube, said second tube having a second leg subjected to said opposing pressure, and oppositely graduated scales alongside said indicating legs for indicating the displacement of each liquid column due to pressure, the high readings of one scale being adjacent the low readings of the other at the lower ends of said scales.

2. A manometer of the long indicating column type comprising a support, two liquid receiving wells mounted on the support, a manometer tube connected to each well, said tubes having vertical indicating legs disposed side by side, one disposed with a major portion thereof above its well and the other with a major portion thereof below its well, means for subjecting the liquid in one well and the liquid in the indicating leg connected to the other well to the pressure to be measured to raise the liquid in one indicating leg and lower the liquid in the other, and oppositely graduated scales alongside the lower portions of said indicating legs for indicating displacements of each liquid column due to pressure, whereby both high and low pressure readings may be taken adjacent lower portions of said indicating legs.

3. A manometer of the long indicating column type comprising a support, a plurality of manometer tubes mounted on said support, each tube having an indicating leg and a leg having a well, one indicating leg being positioned with a major portion thereof above its well and the other indicating leg with a major portion thereof below its well, said indicating legs being positioned side by side, a pressure conduit connected to the well of one manometer tube and to the indicating leg of the other tube, means subjecting the liquid in the other well and the other indicating leg, both to the same opposing pressure, and oppositely graduated scales alongside said indicating legs, whereby both high and low pressure readings may be taken adjacent lower portions of said indicating legs.

4. A manometer of the long indicating column type comprising a support, two liquid receiving wells, a manometer tube connected to each well and each having a vertical indicating leg, said indicating legs being disposed, one with a major portion thereof above its well and the other with a major portion thereof below its well, means for subjecting the liquid in the lower well and the liquid in the indicating leg connected to the other well to the pressure to be measured, and a graduated scale associated with each indicating leg, said scales being oppositely graduated whereby both high and low pressure readings may be taken adjacent lower portions of said indicating legs.

5. A manometer of the long indicating column type comprising a support having a plurality of vertically disposed graduated scales, a plurality of manometer tubes each connected to a well and each having an indicating leg alongside one of said graduated scales, said indicating legs being disposed, one with a major portion thereof above its well and the other with a major portion thereof below its well, and a fluid pressure conduit connected to said manometer tubes, said conduit being connected to the indicating leg of one tube and to the well of another, whereby the fluid pressure in said conduit raises the liquid in one indicating leg and lowers the liquid in the other, and oppositely graduated scales alongside said legs providing indicating means for both high and low pressures adjacent lower portions of said indicating legs.

6. A manometer of the long indicating column type comprising a support, three liquid receiving wells mounted at different heights on the support, a manometer tube connected to each well and having a vertical indicating leg, the indicating leg connected to the lowermost well having its major portion above the same and the other indicating legs having their major portions below their wells, means for subjecting liquid in the lowermost well and the liquid in the indicating legs connected to the other wells to the pressure to be measured and for subjecting the liquid in the indicating leg connected to the lowermost well and the liquid in the two upper wells all to the same opposing pressure, and graduated scales associated with the lower portions of said indicating legs, the scales associated with the legs subjected to the pressure to be measured being graduated reversely to the scale associated with the tube connected to the well to which pressure is applied, whereby both high and low pressure readings may be taken adjacent lower portions of said indicating legs.

ARTHUR A. HEJDUK.

REFERENCES CITED

The following references are of record in the file of this patent:

UNITED STATES PATENTS

| Number | Name | Date |
|---|---|---|
| 379,305 | Brown | Mar. 13, 1888 |
| 664,465 | Claassen | Dec. 25, 1900 |
| 993,029 | Cole | May 23, 1911 |
| 1,262,761 | Ellison | Apr. 16, 1918 |
| 1,598,571 | Fox et al. | Aug. 31, 1926 |
| 1,621,354 | Dawley | Mar. 15, 1927 |
| 2,288,505 | Wetteland | June 30, 1942 |

FOREIGN PATENTS

| Number | Country | Date |
|---|---|---|
| 19,426 | Germany | Oct. 3, 1882 |
| 78,436 | Switzerland | July 16, 1923 |
| 99,976 | Switzerland | July 2, 1918 |
| 523,988 | France | May 6, 1921 |